UNITED STATES PATENT OFFICE.

FREDERICK P. WOOD, OF DETROIT, MICHIGAN, ASSIGNOR TO DETROIT CAN COMPANY, OF DETROIT, MICHIGAN, A CORPORATION OF NEW JERSEY.

ADHESIVE TO BE EMPLOYED IN THE MANUFACTURE OF PAPER-WALLED VESSELS.

1,137,043. Specification of Letters Patent. Patented Apr. 27, 1915.

No Drawing. Application filed November 12, 1912. Serial No. 730,877.

*To all whom it may concern:*

Be it known that I, FREDERICK P. WOOD, a subject of the Kingdom of Great Britain, residing in Detroit, in the county of Wayne and State of Michigan, have invented a new and useful Improvement in Adhesives to be Employed in the Manufacture of Paper-Walled Vessels, of which the following is a specification.

This invention relates to an adhesive to be employed in the manufacture of paper-walled vessels and consists in the new compound hereinafter more fully set forth and claimed.

In the art of making paper-walled vessels, damp-proof quality may be imparted to the walls by making them of two or more layers of paper cemented together by some adhesive which has the quality of rendering the compound paper structure impervious to air, gases and moisture, and a film of which will remain unabsorbed between the layers of paper.

It is the object of the present invention to produce such an adhesive having the following qualities: It shall have the property of becoming fluid and adhesive by heat and set or hard by cooling; it shall have a higher melting point after a time than when first applied; it shall have sufficient permanent flexibility so that the walls shall not crack after aging or when dented in handling; it shall impart no taste or odor to the contents of the vessel in the construction of the walls of which it is employed; it shall be unaffected by the contents of the vessel; it shall be of such nature as not to be absorbed by the capillary attraction of the cellulose in the said walls; it shall be cheap.

I have found that an adhesive containing all of the foregoing qualities can be compounded, preferably of gilsonite, a natural asphaltite that may be described as being of the specific gravity at 77° Fahrenheit of 1.06 to 1.10, having a melting point of 250° to 350° Fahrenheit, a fixed carbon content of 10 to 20 per centum having a conchoidal fracture, a bright luster, and softening and flowing in flame without splitting, burning or decrepitating. Or in lieu of gilsonite the petroleum residuum known as parolite and which has quite similar qualities, appearance and properties, may be used. I have found also that elaterite may be employed if fused in China wood oil. I have not found it advisable to use elaterite dissolved in China wood oil except for the manufacture of articles where the offensive odor that pertains to China wood oil can be disregarded. I prefer to mix with this asphaltite or asphaltite-like element a portion of some non-oxidizable substance, such as vaseline, petrolatum or one of the non-oxidizable vegetable oils, to prevent the compound from becoming brittle when cold or aged, and thus to overcome all danger of the layer of adhesive being cracked by the bending or denting of the paper walls in which it is used. I also prefer to add a portion of some oxidizable oil, as for example, ordinary linseed oil boiled with litharge, such as commonly used in paint. The purpose of this latter addition is to promote a subsequent hardening or toughening of the adhesive after application, which is brought about by the subsequent oxidization of the linseed or other oxidizable oil. This subsequent oxidation acts to raise the melting point of the adhesive after it has been applied, thus enabling the completed vessel made with such walls to stand a higher degree of heat without disintegration than it otherwise could endure.

The best formula for making the improved compound of this invention that I now know is the following: Take of gilsonite 300 lbs.; of the boiled linseed oil 40 lbs.; of vaseline or petrolatum 150 lbs.; and melt all together. The mixing may acquire a temperature approximately of 620° Fahrenheit at which it will become extremely fluid. But, after the compound is once made, it will remelt sufficiently for application at 240° to 245° Fahrenheit, at which temperature it becomes about the consistency of molasses. It is now in this warm condition spread upon the paper in any of the well known methods of making pasteboard, pressure preferably being brought to bear upon the compound sheet to perfect the union. It is not necessary, however, that the two sheets of paper shall be united immediately after coating one of them, because the adhesive upon the coated sheet may be allowed to become cold when it will present a smooth, hard surface, not sticky, and which may be easily handled in the subsequent manufacture of articles from the material, and this property enables the joints in a paper-walled vessel to be readily made by the use of heat and pressure alone long after the coating of adhesive has been applied.

I claim:—

1. A fusible, adhesive compound which becomes adhesive solely by fusion and which when cold is not sticky, containing as a principal ingredient thereof a fusible asphaltite, and also containing a non-drying oil, substantially as specified.

2. A fusible, adhesive compound which becomes adhesive solely by fusion, containing as a principal ingredient thereof, gilsonite, and containing also a drying oil and a non-drying oil, substantially as specified.

3. A fusible, adhesive compound which becomes adhesive solely by fusion and which when cold is not sticky consisting of gilsonite, boiled linseed oil and vaseline, substantially as specified.

4. A fusible adhesive compound which becomes adhesive solely by fusion and which when cold is not sticky consisting of proportionably three hundred pounds of a fusible asphaltite, forty pounds of a drying oil and one hundred and fifty pounds of a non-drying oil, substantially as specified.

FREDERICK P. WOOD.

Witnesses:
 ARTHUR F. HENZE,
 E. F. CLOUGH.